United States Patent
Cao et al.

(10) Patent No.: US 12,111,653 B1
(45) Date of Patent: Oct. 8, 2024

(54) DIAGONAL EQUAL-HOP HETEROGENEOUS COMPOSITE REDUNDANCY DOMAIN ARCHITECTURE OF AN INTELLIGENT VEHICLE

(71) Applicant: SHENZHEN AUTOMOTIVE RESEARCH INSTITUTE, BEIJING INSTITUTE OF TECHNOLOGY (SHENZHEN RESEARCH INSTITUTE OF NATIONAL ENGINEERING LABORATORY FOR ELECTRIC VEHICLES), Guangdong (CN)

(72) Inventors: Wanke Cao, Guangdong (CN); Wenwei Wang, Guangdong (CN); Jinrui Nan, Guangdong (CN)

(73) Assignee: SHENZHEN AUTOMOTIVE RESEARCH INSTITUTE, BEIJING INSTITUTE OF TECHNOLOGY (SHENZHEN RESEARCH INSTITUTE OF NATIONAL ENGINEERING LABORATORY FOR ELECTRIC VEHICLES), Shenzhen (CN)

( * ) Notice: Subject to any disclaimer, the term of this patent is extended or adjusted under 35 U.S.C. 154(b) by 0 days.

(21) Appl. No.: 18/575,309

(22) PCT Filed: Jan. 21, 2022

(86) PCT No.: PCT/CN2022/073070
§ 371 (c)(1),
(2) Date: Dec. 29, 2023

(87) PCT Pub. No.: WO2023/065560
PCT Pub. Date: Apr. 27, 2023

(30) Foreign Application Priority Data

Oct. 21, 2021 (CN) .......................... 202111223639.2

(51) Int. Cl.
*G05B 9/03* (2006.01)
*B60R 16/023* (2006.01)
(Continued)

(52) U.S. Cl.
CPC .............. *G05B 9/03* (2013.01); *B60R 16/023* (2013.01); *H04L 12/40* (2013.01); *H04L 12/44* (2013.01);
(Continued)

(58) Field of Classification Search
CPC ......... G05B 9/03; B60R 16/023; H04L 12/40; H04L 12/44; H04L 12/66; H04L 67/12; H04L 2012/40215; H04L 2012/40273
See application file for complete search history.

(56) References Cited

U.S. PATENT DOCUMENTS

2009/0154391 A1* 6/2009 Wittenschlaeger ..... H04L 41/12
370/316
2018/0273005 A1* 9/2018 Redder ................... B60T 8/885
(Continued)

FOREIGN PATENT DOCUMENTS

| CN | 103354991 A | 10/2013 |
|---|---|---|
| CN | 105703993 A | 6/2016 |

(Continued)

OTHER PUBLICATIONS

1st Office Action of counterpart Chinese Patent Application No. 202111223639.2 issued on Nov. 25, 2021.
(Continued)

*Primary Examiner* — Vincent H Tran

(57) ABSTRACT

A diagonal equal-hop heterogeneous composite redundancy domain architecture of an intelligent vehicle, comprising: a central gateway, and ADAS domain controller, a vehicle-mounted audio and video domain controller, a vehicle chassis domain controller, and an energy domain controller.
(Continued)

The central gateway is respectively communicatively connected to the ADAS domain controller, the vehicle-mounted audio and video domain controller, the vehicle chassis domain controller, and the energy domain controller, such that the central gateway, the ADAS domain controller, the vehicle-mounted audio and video domain controller, the vehicle chassis domain controller, and the energy domain controller form a star connection topological structure; and the ADAS domain controller, the vehicle-mounted audio and video domain controller, the vehicle chassis domain controller, and the energy domain controller form an annular connection topological structure.

8 Claims, 9 Drawing Sheets

(51) Int. Cl.
  *H04L 12/40* (2006.01)
  *H04L 12/44* (2006.01)
  *H04L 12/66* (2006.01)
  *H04L 67/12* (2022.01)

(52) U.S. Cl.
  CPC .............. *H04L 12/66* (2013.01); *H04L 67/12* (2013.01); *H04L 2012/40215* (2013.01); *H04L 2012/40273* (2013.01)

(56) References Cited

U.S. PATENT DOCUMENTS

| | | | |
|---|---|---|---|
| 2022/0006669 A1* | 1/2022 | Wang | H04L 12/4604 |
| 2022/0141049 A1* | 5/2022 | Lee | H04L 12/40 |
| | | | 701/1 |

FOREIGN PATENT DOCUMENTS

| | | |
|---|---|---|
| CN | 206932240 U | 1/2018 |
| CN | 109606290 A | 4/2019 |
| CN | 109917765 A | 6/2019 |
| CN | 110562171 A | 12/2019 |
| CN | 111262768 A | 6/2020 |
| CN | 111314420 A | 6/2020 |
| CN | 210652984 U | 6/2020 |
| CN | 112422373 A | 2/2021 |
| CN | 113002455 A | 6/2021 |
| CN | 113055195 A | 6/2021 |
| CN | 113401077 A | 9/2021 |
| CN | 113460085 A | 10/2021 |
| EP | 3866406 A1 | 8/2021 |
| WO | WO-2020210729 A1 * | 10/2020 ......... B60R 16/0231 |

OTHER PUBLICATIONS

Notice of Allowance of counterpart Chinese Patent Application No. 202111223639.2 issued on Jan. 12, 2022.
International Search Report of PCT Patent Application No. PCT/CN2022/073070 issued on Jun. 28, 2022.

* cited by examiner

DIAGONAL EQUAL-HOP HETEROGENEOUS COMPOSITE REDUNDANCY DOMAIN ARCHITECTURE OF AN INTELLIGENT VEHICLE

TECHNICAL FIELD

The present disclosure relates to intelligent vehicles, in particular to a diagonal equal-hop heterogeneous composite redundancy domain architecture of an intelligent vehicle.

BACKGROUND

With increasing demand for energy conservation, environmental protection and safety in travel in recent years, the electrification, networking and intelligence of automobiles have become mainstream trend in the development of automobiles. Assisted driving systems, intelligent energy technology, infotainment systems and various new body systems have been greatly developed in automobiles, which have greater advantages over traditional automobiles in terms of driving safety, green travel, and efficient energy applications. However, the application of a large number of electronic control systems has also brought new challenges to modern vehicles; that is, the traditional automotive electronic and electrical architectures and vehicle-mounted networks have been difficult to meet the needs of automotive development, and more and more electronic components and electronic control units have affected the functions of various modern vehicles. As a result, requirements for real-time continuous transmission of environmental perception, short data packets transmission of power chassis control systems, high flexibility of body systems and high throughput of infotainment systems cannot be met.

Design methods for new domain architectures of automobiles have been emerged for providing new solutions to the above problems; and on this basis, domain controllers with high computing power can integrate a variety of functions of electronic control systems and thus greatly decrease the number of automotive electronic components, and network architectures with simple topology can shorten the length of vehicle-mounted cables and thus reduce adverse impacts on the electronic control systems. Therefore, design models for various domain architectures have been developed and trialed, providing more reliable guarantees for the application of advanced control technology.

However, the introduction of domain architecture systems has also brought new factors to the functions of automotive electronic control systems. Taking automatic emergency braking function, the most basic driving safety assurance function related to autonomous driving, as an example, the automatic emergency braking function under domain architecture designs will be jointly participated by multiple domain controllers. Problems, such as different requirements for signal types of different domains, baud rate and bandwidth, and different network protocols among different components, need to be explored and solved. Furthermore, problems including the stability of the automatic emergency braking system under the domain architectures, the safety redundancy management of the system and the redundancy design of component failures are key challenges that must be faced directly to ensure the stability and real-time performance of autonomous driving safety technology.

SUMMARY

A diagonal equal-hop heterogeneous composite redundancy domain architecture of an intelligent vehicle is provided in the present disclosure to improve the stability of signal transmission among various controllers of the intelligent vehicle.

Disclosed is a diagonal equal-hop heterogeneous composite redundancy domain architecture of an intelligent vehicle comprising: a central gateway, an ADAS domain controller, a vehicle-mounted audio and video domain controller, a vehicle chassis domain controller and an energy domain controller.

The central gateway may be communicably connected to the ADAS domain controller, the vehicle-mounted audio and video domain controller, the vehicle chassis domain controller and the energy domain controller, respectively, such that the central gateway may form a star connection topological structure with the ADAS domain controller, the vehicle-mounted audio and video domain controller, the vehicle chassis domain controller and the energy domain controller.

The ADAS domain controller may be also communicably connected to the vehicle-mounted audio and video domain controller and the energy domain controller respectively, and the vehicle chassis domain controller may also be communicably connected to the vehicle-mounted audio and video domain controller and the energy domain controller respectively, such that the ADAS domain controller, the vehicle-mounted audio and video domain controller, the vehicle chassis domain controller and the energy domain controller form a annular connection topological structure.

In an embodiment, a communication node spacing between the ADAS domain controller and the vehicle chassis domain controller may be always 1; and a communication node spacing between the vehicle-mounted audio and video domain controller and the energy domain controller may always also be 1.

In an embodiment, the central gateway may be, through dual redundance vehicle-mounted Ethernet or CANFD, communicably connected to the ADAS domain controller, the vehicle-mounted audio and video domain controller, the vehicle chassis domain controller and the energy domain controller, respectively;

the ADAS domain controller may also be communicably connected to the vehicle-mounted audio and video domain controller and the energy domain controller respectively through annular inter-domain vehicle-mounted Ethernet or CANFD; and
the vehicle chassis domain controller may also be communicably connected to the vehicle-mounted audio and video domain controller and the energy domain controller through the annular inter-domain vehicle-mounted Ethernet or CANFD.

In an embodiment, a communication routing status among the central gateway, the ADAS domain controller, the vehicle-mounted audio and video domain controller, the vehicle chassis domain controller and the energy domain controller may be detected in real time, and a corresponding routing work policy may be selected based on the communication routing status.

In an embodiment, the routing work policy may include the following four routing work policies:
a first routing work policy: when the central gateway operates normally, the ADAS domain controller, the vehicle-mounted audio and video domain controller, the vehicle chassis domain controller and the energy domain controller may transmit data thereamong through the central gateway;
a second routing work policy: when the central gateway fails, the ADAS domain controller, the vehicle-mounted audio and video domain controller, the vehicle chassis domain controller and the energy domain controller may transmit data thereamong through the annular connection topological structure;

a third routing work policy: when the central gateway fails and communication between the vehicle-mounted audio and video domain controller and the vehicle chassis domain controller also fails, the communication routing may be: intercommunication between the vehicle-mounted audio and video domain controller and the ADAS domain controller, intercommunication between the ADAS domain controller and the energy domain controller, and communication between the energy domain controller and the vehicle chassis domain controller; and a fourth routing work policy: when the central gateway fails and communication between the ADAS domain controller and the energy domain controller also fails, the communication routing may be: intercommunication between the ADAS domain controller and the vehicle-mounted audio and video domain controller, intercommunication between the vehicle-mounted audio and video domain controller and the vehicle chassis domain controller, and intercommunication between the vehicle chassis domain controller and the energy domain controller.

In an embodiment, the ADAS domain controller may include: an ADAS domain composite receiving unit, an automatic emergency braking environment sensing unit, an automatic emergency braking data analysis and processing unit, an ADAS domain scheduling control cooperating unit and a first loop scheduler unit.

In an embodiment, the energy domain controller may include: an energy domain composite receiving unit, a battery management unit, a brake energy regenerating unit, an energy domain scheduling control cooperating unit and a second loop scheduler unit.

In an embodiment, the vehicle chassis domain controller may include: a vehicle chassis domain composite receiving unit, a brake controlling unit, a brake torque distributing unit, a vehicle chassis domain scheduling control cooperating unit and a third loop scheduler unit.

In an embodiment, the vehicle-mounted audio and video domain controller may include: a vehicle-mounted audio and video domain composite receiving unit, an obstruction image transmitting unit, a brake alarming unit, a vehicle-mounted audio and video domain scheduling control cooperating unit and a fourth loop scheduler unit.

Disclosed also is an intelligent vehicle having the diagonal equal-hop heterogeneous composite redundancy domain architecture of an intelligent vehicle mentioned above.

With the diagonal equal-hop heterogeneous composite redundancy domain architecture of an intelligent vehicle mentioned in any of the above embodiments, which includes a central gateway, an ADAS domain controller, a vehicle-mounted audio and video domain controller, a vehicle chassis domain controller and an energy domain controller respectively, the central gateway being communicably connected to the ADAS domain controller, the vehicle-mounted audio and video domain controller, the vehicle chassis domain controller and the energy domain controller such that the central gateway, the ADAS domain controller, the vehicle-mounted audio and video domain controller, the vehicle chassis domain controller and the energy domain controller form a star connection topological structure, the ADAS domain controller being communicably connected to the vehicle-mounted audio and video domain controller and the energy domain controller respectively, and the vehicle chassis domain controller being communicably connected to the vehicle-mounted audio and video domain controller and the energy domain controller respectively such that the ADAS domain controller, the vehicle-mounted audio and video domain controller, the vehicle chassis domain controller and the energy domain controller form an annular connection topological structure; in this way, each domain controller may form an annular connection topology through the annular inter-domain network, the star topology and the annular topology are fault-tolerant to each other to improve the stability of signal transmission.

DETAILED DESCRIPTION

Figure 1:
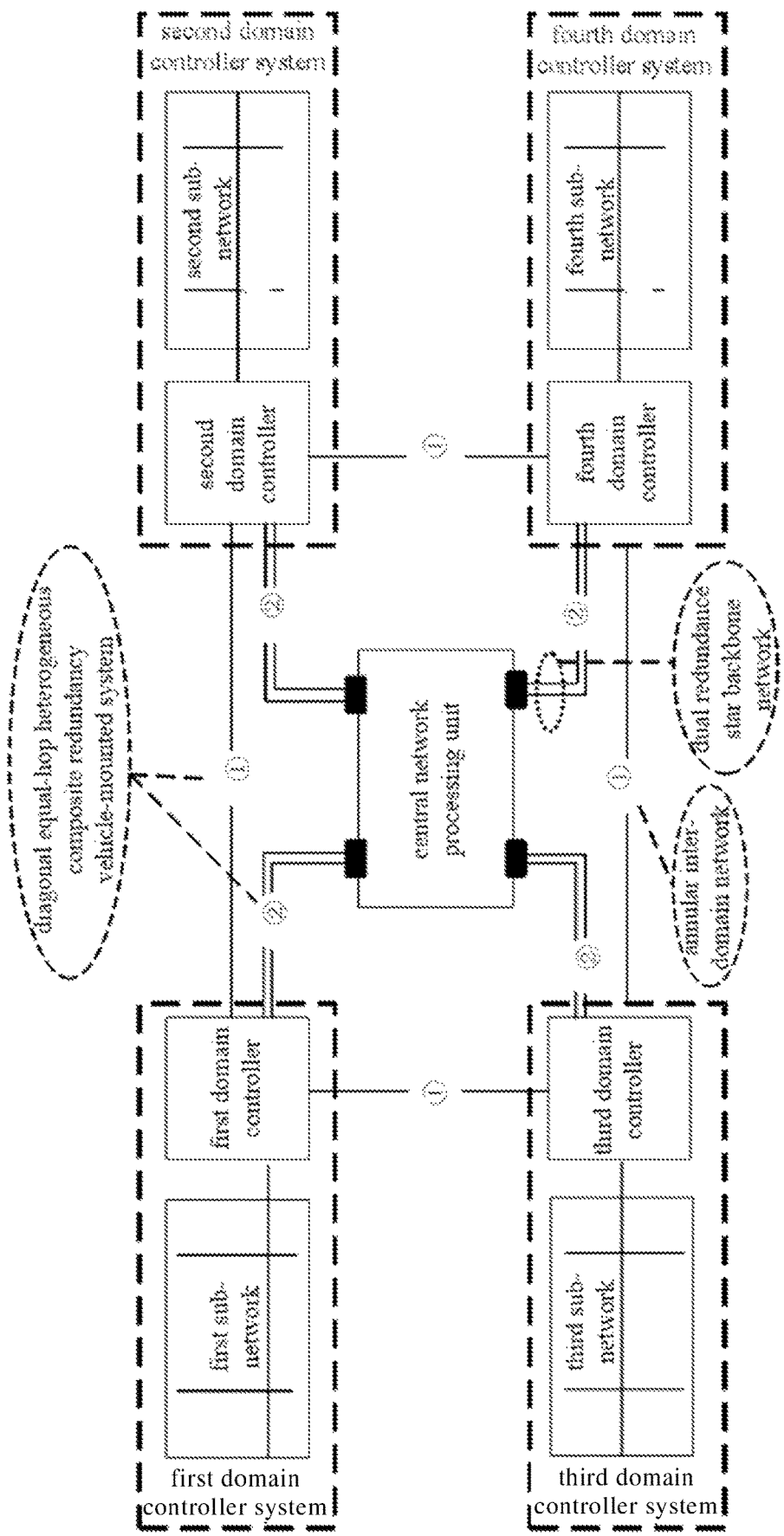
FIG. 1 is a schematic diagram of the overall structure of a diagonal equal-hop heterogeneous composite redundancy domain architecture according to the present disclosure.

The present disclosure will be further described in detail below through specific embodiments with reference to the accompanying drawings. Common or similar elements are referenced with like or identical reference numerals in different embodiments. Many details described in the following embodiments are for the purpose of better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the field.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning.

The diagonal equal-hop heterogeneous composite redundancy domain architecture of an intelligent vehicle disclosed herein is conceived by as follows: as shown in FIG. 1, a plurality of domain control systems of the intelligent vehicle is configured as a star topological structure and an annular topological structure together with a central network processing unit thereof, and the star topology and the annular topology are fault-tolerant to each other to ensure the reliability and timeliness of data transmission. For example, there are four domain controller systems in FIG. 1, namely, a first domain controller system, a second domain controller system, a third domain controller system and a fourth domain controller system; wherein each domain controller system may include a domain controller and a sub-network, for instance, the first domain controller system may include a first domain controller and a first sub-network. The first domain controller system, the second domain controller system, the third domain controller system and the fourth domain controller system may all be communicably coupled to the central network processing unit through a dual redundance star backbone network, such that the four controller systems and the central network processing unit form the star topological structure. At the same time, the two adjacent domain controller systems may be communicably connected to the annular inter-domain network, so that the four domain controller systems may form the annular topological structure, and each domain controller may form the annular connection topology through the annular inter-domain network. In this way, the star topology and the annular topology are fault-tolerant to each other to ensure the stability of communication.

Furthermore, in order to ensure the timeliness of communication among various domain controller systems, the data exchange among the domain controllers in diagonal positions herein is based on the principle of equal-hop communication, which is as follows: based on a heterogeneous composite connection topology, by means of star connection topology or annular connection topology, the communication node spacing between the diagonal first and fourth domain controllers is ensured to be always 1, and the communication node spacing between the second and third domain controllers is also ensured to be always 1, accordingly, the relative position order of each domain controller in the annular connection topology may remain unchanged to ensure equal-hop redundant fault-tolerant communication among diagonal domain controllers.

Embodiment 1

Figure 2:
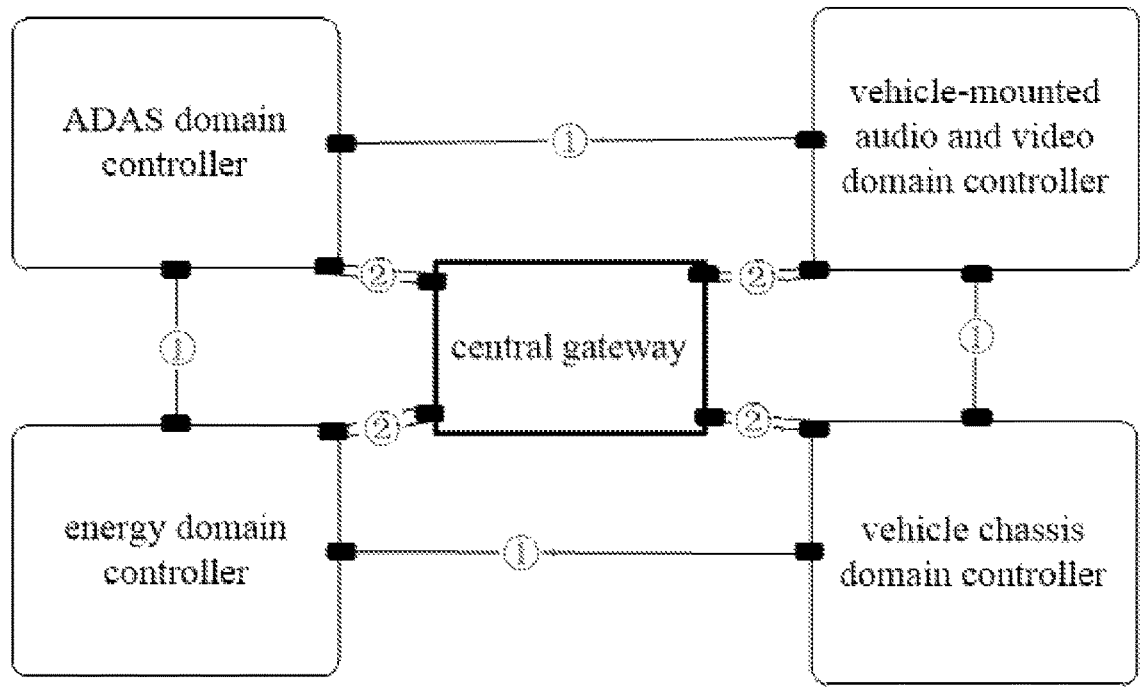
FIG. 2 is a schematic diagram of a specific structure of a diagonal equal-hop heterogeneous composite redundancy domain architecture according to an embodiment of the present disclosure.

Please referring to FIG. 2, the diagonal equal-hop heterogeneous composite redundancy domain architecture of an intelligent vehicle is provided in a first embodiment. There may be four domain controllers in this embodiment, namely, an ADAS domain controller, a vehicle-mounted audio and video domain controller, a vehicle chassis domain controller and an energy domain controller. The central network processing unit in this embodiment may be a central gateway.

The central gateway may be communicably connected to the ADAS domain controller, the vehicle-mounted audio and video domain controller, the vehicle chassis domain controller and the energy domain controller respectively, such that the central gateway may form a star connection topological structure together with the ADAS domain controller, the vehicle-mounted audio and video domain controller, the vehicle chassis domain controller and the energy domain controller. The ADAS domain controller may be communicably connected to the vehicle-mounted audio and video domain controller and the energy domain controller respectively, and the vehicle chassis domain controller may be communicably connected to the vehicle-mounted audio and video domain controller and the energy domain controller respectively, such that the ADAS domain controller, the vehicle-mounted audio and video domain controller, the vehicle chassis domain controller and the energy domain controller form the annular connection topological structure. The star topology and the annular topology may be fault-tolerant to each other to ensure the stability of communication. FIGS. 3, 4, 5 and 6 schematically show the structures of the ADAS domain controller, the vehicle-mounted audio and video domain controller, the vehicle chassis domain controller and the energy domain controller respectively.

The data exchange between the ADAS domain controller and the vehicle chassis domain controller may be based on the principle of equal-hop communication. The equal-hop communication principle in this embodiment may be based on heterogeneous composite connection topology, which stipulates that the ADAS domain controller and the chassis domain controller are strictly diagonally positioned, and the star connection topology or annular connection topology can ensure that the communication node spacing between the ADAS domain controller and the vehicle chassis domain controller is always 1, and the communication node spacing between the vehicle-mounted audio and video domain controller and the energy domain controller is also always 1, ensuring that equal-hop redundant fault-tolerant communication between the ADAS domain controller and the vehicle chassis domain controller is realized.

Specifically, the central gateway and the loop scheduler unit of each domain controller adopt a scheduling procedure based on a fractional basic period in this embodiment, in which a system sampling period T is equally divided into n parts, each part being one fractional basic period, that is, the length of the fractional basic period is $\varepsilon=T/n$, and meets:

$$\varepsilon > \Sigma[\max(T_{message})]$$

where, $\varepsilon$ represents the fractional basic period, also known as a time constant; max ( ) represents a maximum operation, $\Sigma$ ( ) represents a summation operation, $T_{message}$ represents time for information transmission within the fractional basic period, and the number of the fractional basic period(s) is n=4, that is, one system sampling period includes a fractional basic period I, a fractional basic period II, a fractional basic period III and a fractional basic period IV.

In this embodiment, the central gateway may be communicably connected to the ADAS domain controller, the vehicle-mounted audio and video domain controller, the vehicle chassis domain controller and the energy domain controller respectively through dual redundance vehicle-mounted Ethernet or CANFD; the ADAS domain controller may also be communicably connected to the vehicle-mounted audio and video domain controller and the energy domain controller respectively through the annular inter-domain vehicle-mounted Ethernet or CANFD; and the vehicle chassis domain controller may also be communicably connected to the vehicle-mounted audio and video domain controller and the energy domain controller respectively through the annular inter-domain vehicle-mounted Ethernet or CANFD.

In an embodiment, a communication routing status among the central gateway, the ADAS domain controller, the vehicle-mounted audio and video domain controller, the vehicle chassis domain controller and the energy domain controller may be detected in real time, and a corresponding routing work policy may be selected based on the communication routing status.

Specifically, the routing work policy in this embodiment may include the following four routing work policies:

- a first routing work policy, in which when the central gateway operates normally, the ADAS domain controller, the vehicle-mounted audio and video domain controller, the vehicle chassis domain controller and the energy domain controller may transmit data thereamong through the central gateway.
- a second routing work policy, in which when the central gateway fails, the ADAS domain controller, the vehicle-mounted audio and video domain controller, the vehicle chassis domain controller and the energy domain controller may transmit data thereamong through the annular connection topological structure, that is, data of each domain controller may be transmitted through the annular inter-domain vehicle-mounted Ethernet/CANFD.
- a third routing work policy, in which when the central gateway fails and communication between the vehicle-mounted audio and video domain controller and the vehicle chassis domain controller also fails, the communication routing may include: intercommunication between the vehicle-mounted audio and video domain controller and the ADAS domain controller, intercommunication between the ADAS domain controller and the energy domain controller, and communication between the energy domain controller and the vehicle chassis domain controller; and accordingly, this work policy is applicable to a situation where the central gateway fails, a right-half loop also fails, and data among each domain controller is transmitted by means of a left-half loop, wherein the right-half loop may refer to the vehicle-mounted audio and video domain controller and its connected annular inter-domain vehicle-mounted Ethernet/CANFD, and the left-half loop may refer to the energy domain controller and its connected annular inter-domain vehicle-mounted Ethernet/CANFD; and
- a fourth routing work policy, in which when the central gateway fails and communication between the ADAS domain controller and the energy domain controller also fails, the communication routing may include: intercommunication between the ADAS domain controller and the vehicle-mounted audio and video domain controller, intercommunication between the vehicle-mounted audio and video domain controller and the vehicle chassis domain controller, and intercommunication between the vehicle chassis domain controller and the energy domain controller. This work policy is applicable to a situation where the central gateway fails and the left-half hoop also fails, data among each domain controller is transmitted by means of the right-half loop with the annular inter-domain vehicle-mounted Ethernet/CANFD.

Figure 11:
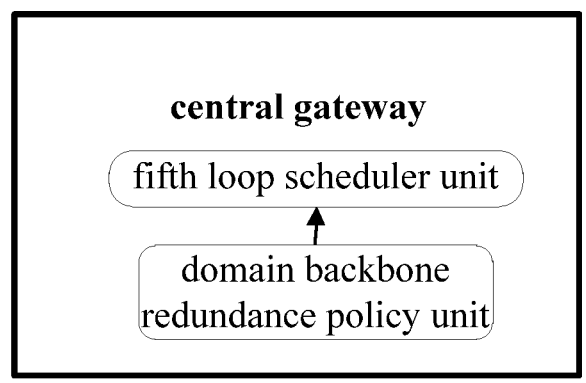
FIG. 11 is a schematic diagram of the structure of a central gateway according to an embodiment of the present disclosure.

The structure of the central gateway in an embodiment of the present disclosure may adopt dual redundance vehicle-mounted Ethernet/CANFD connecting with each domain controller, and require the dual redundance vehicle-mounted Ethernet/CANFD at the same location to comply with: the speeds at the physical ports being identical and the media of the physical ports being identical. As shown in FIG. 11, the central gateway is equipped with a domain backbone redundance policy unit and a fifth loop scheduler unit. The domain backbone redundance policy unit may be configured to determine the redundance policy of the dual redundance backbone network; and the fifth loop scheduler unit may be configured to transmit scheduling signals from the central gateway.

The following describes the communication process in this embodiment to solve the above work policies and the principle of equal-hop communication.

(1) Under the first routing work policy, the control system is fault-free, and the scheduling procedure based on a fractional basic period includes: a fractional basic period I being configured to transmit sensor signals from transferring sensor nodes to the ADAS domain controller, the fractional basic period II being configured to transmit a brake decision signal by the ADAS domain controller to the central gateway, and the fractional basic period III being configured to transmit the brake decision signal by the central gateway to the vehicle chassis domain controller. At the beginning of the fractional basic period I, the ADAS domain sends a start broadcast frame of the basic period, thus maintaining the operation of the fractional basic period scheduling procedure.

(2) Under the second routing work policy, the central gateway is failed, and the scheduling procedure based on a fractional basic period includes: the fractional basic period I being configured to transmit sensor signals from transferring sensor nodes to the ADAS domain controller, the fractional basic period II being configured to transmit the brake decision signal by the ADAS domain controller to the energy domain or the vehicle-mounted audio and video domain, and the fractional basic period III being configured to transmit the brake decision signal by the energy domain or the vehicle-mounted audio and video domain to the vehicle chassis domain controller. At the beginning of the fractional basic period I, the ADAS domain sends a start broadcast frame of the basic period, thus maintaining the operation of the fractional basic period scheduling procedure.

(3) Under the third routing work policy, the central gateway fails, the vehicle-mounted audio and video domain controller fails, and the scheduling procedure based on a fractional basic period includes: the fractional basic period I being configured to transmit sensor signals from transferring sensor nodes to the ADAS domain controller, the fractional basic period II being configured to transmit the brake decision signal by the ADAS domain controller to the energy domain, and the fractional basic period III being configured to transmit the brake decision signal by the energy domain to the vehicle chassis domain controller. At the beginning of the fractional basic period I, the ADAS domain sends a start broadcast frame of the basic period, thus maintaining the operation of the fractional basic period scheduling procedure.

(4) Under the fourth routing work policy, the central gateway and the vehicle-mounted audio and video domain controller fail, and the scheduling procedure based on a fractional basic period includes: the fractional basic period I being configured to transmit sensor signals from transferring sensor nodes to the ADAS domain controller, the fractional basic period II being configured to transmit the brake decision signal by the ADAS domain controller to the vehicle audio and video domain, and the fractional basic period III being configured to transmit the brake decision signal by the vehicle audio and video domain to the vehicle chassis domain controller. At the beginning of the fractional basic period I, the ADAS domain sends a start broadcast frame of the basic period, thus maintaining the operation of the fractional basic period scheduling procedure.

Figure 7:
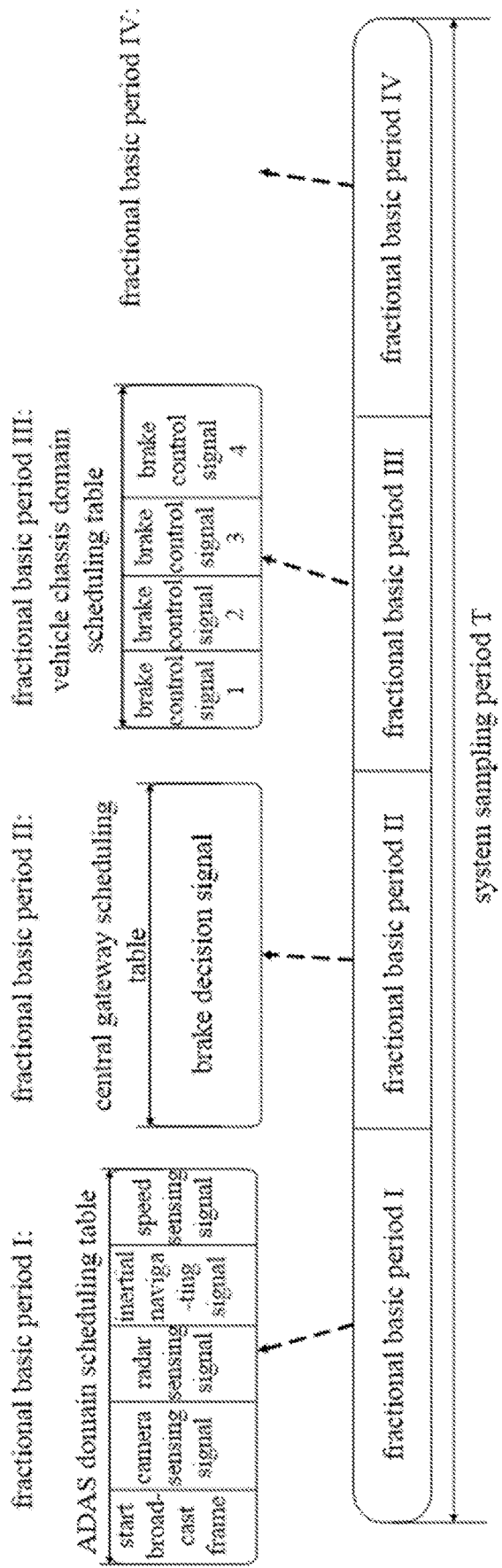
FIG. 7 is a schematically routing diagram of the architecture in an example according to the present disclosure.

As shown in FIG. 7, under the normal work policy in which the control system is fault-free, the scheduling procedure based on a fractional basic period includes: the fractional basic period I being configured to transmit sensor signals from transferring sensor nodes to the ADAS domain controller, the fractional basic period II being configured to transmit the brake decision signal from the ADAS domain controller to the central gateway, and the fractional basic period III being configured to transmit the brake decision signal from the central gateway to the vehicle chassis domain controller; and at the beginning of the fractional basic period I, the ADAS domain may send a start broadcast frame of the basic period, thus maintaining the operation of the fractional basic period scheduling procedure.

Figure 8:
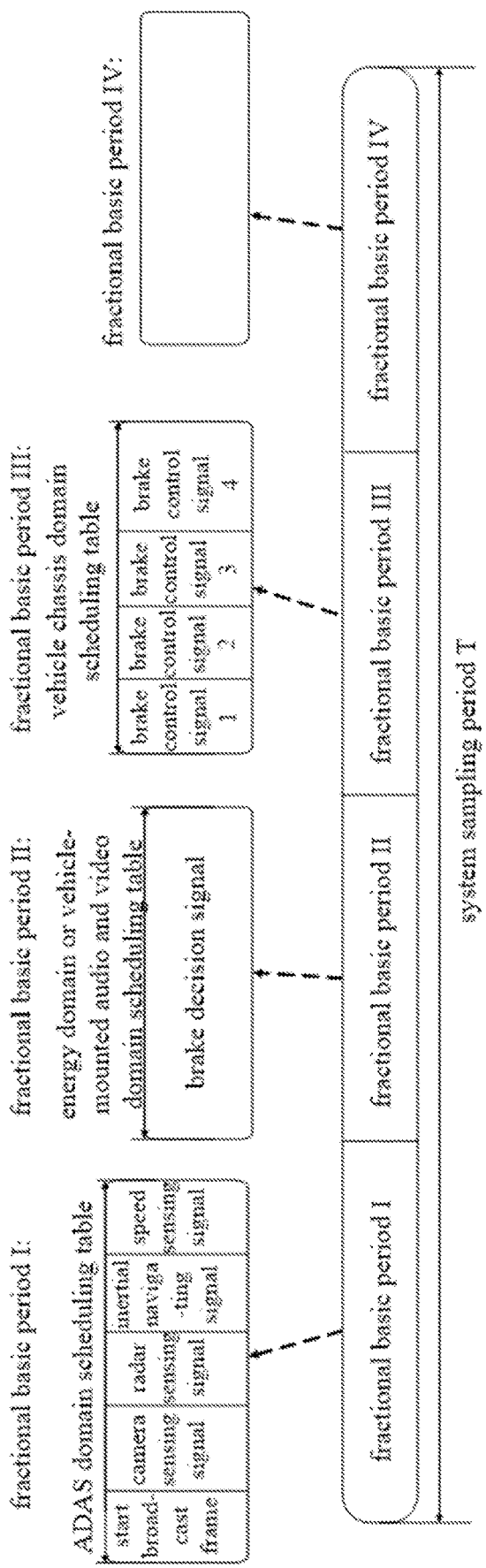
FIG. 8 is a schematically routing diagram of the architecture in another example according to the present disclosure.

As shown in FIG. 8, under a policy for fault condition 1 in which the central gateway fails, the scheduling procedure based on a fractional basic period may include: the fractional basic period I being configured to transmit sensor signals from transferring sensor nodes to the ADAS domain controller, the fractional basic period II being configured to transmit the brake decision signal from the ADAS domain controller to energy domain or vehicle-mounted audio and video domain, and the fractional basic period III being configured to transmit the brake decision signal from the energy domain or vehicle-mounted audio and video domain to the vehicle chassis domain controller; and at the beginning of the fractional basic period I, the ADAS domain sends a start broadcast frame of the basic period, thus maintaining the operation of the fractional basic period scheduling procedure.

Figure 9:
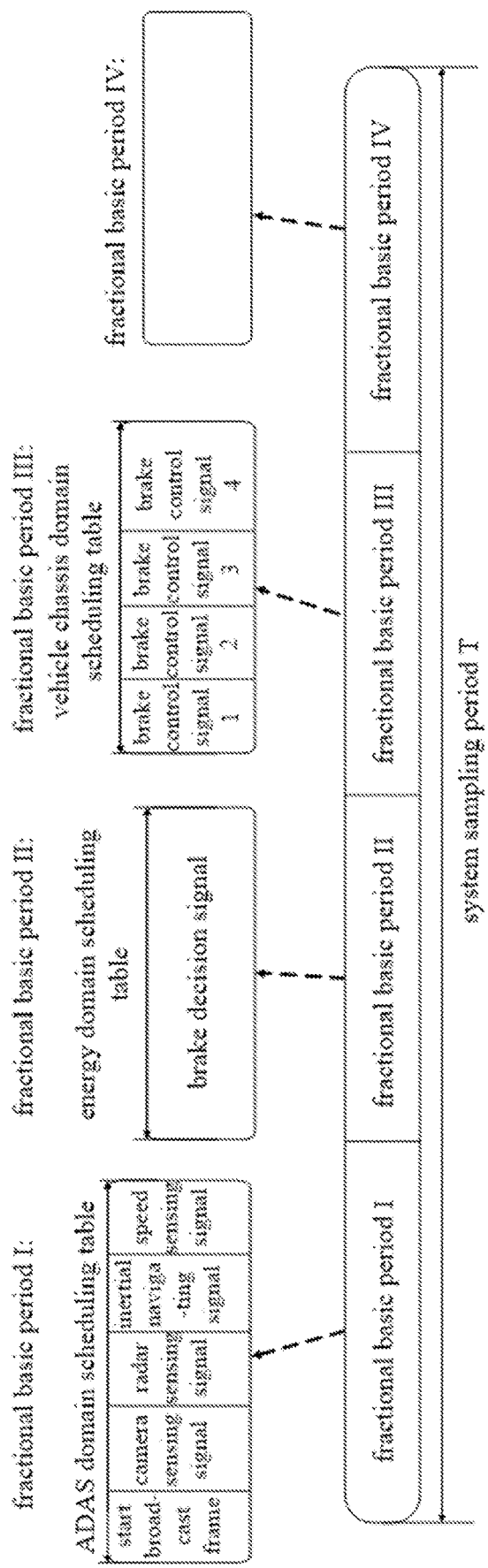
FIG. 9 is a schematically routing diagram of the architecture in still another example according to the present disclosure.

As shown in FIG. 9, under a policy for fault condition a in which the central gateway and the vehicle-mounted audio and video domain controller fail, and the scheduling procedure based on a fractional basic period may include: the fractional basic period I being configured to transmit sensor signals from transferring sensor nodes to the ADAS domain controller, the fractional basic period II being configured to transmit the brake decision signal from the ADAS domain controller to the energy domain, and the fractional basic period III being configured to transmit the brake decision signal from the energy domain to the vehicle chassis domain controller; and at the beginning of the fractional basic period I, the ADAS domain sends a start broadcast frame of the basic period, thus maintaining the operation of the fractional basic period scheduling procedure.

Figure 10:
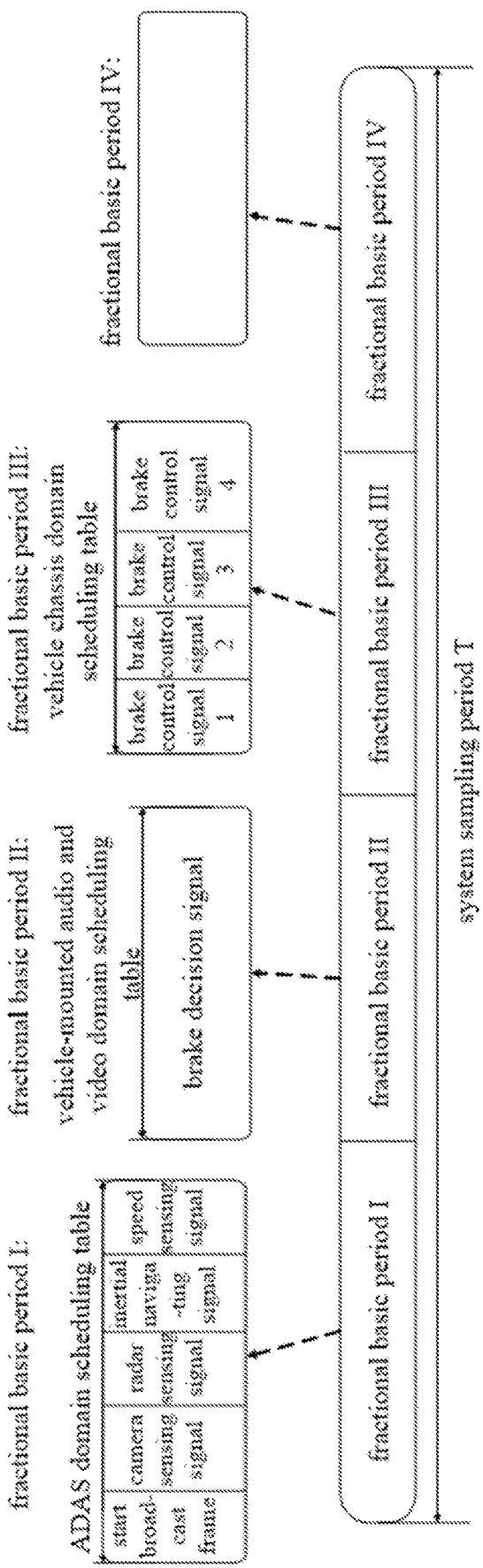
FIG. 10 is a schematically routing diagram of the architecture in yet another example according to the present disclosure.

As shown in FIG. 10, under a policy for fault condition 3 in which the central gateway and the vehicle-mounted audio and video domain controller fail, the scheduling procedure based on a fractional basic period may include: the fractional basic period I being configured to transmit sensor signals from transferring sensor nodes to the ADAS domain controller the fractional basic period II being configured to transmit the brake decision signal from the ADAS domain controller to the vehicle audio and video domain, and the fractional basic period III being configured to transmit the brake decision signal from the vehicle audio and video domain to the vehicle chassis domain controller; and at the beginning of the fractional basic period I, the ADAS domain sends a start broadcast frame of the basic period, thus maintaining the operation of the fractional basic period scheduling procedure.

The calculation formula for loop delay of the domain architecture may be:

$$\tau_{service,k} = \sum_{i=1}^{n-2}\left(\tau_{node_x,i,m,k} + \tau_{node_y,i,m,k}\right) + \sum_{j=1}^{n-1}(\tau_{channel_x,j,m,k} + \tau_{channel\_y,j,m,k})$$

where m=1,2,3 . . . . M; k=1,2,3 . . . ; i=1,2,3 . . . n−2; j=1,2,3 . . . n−1.

where, $\tau_{node\_x,i,m,k}$ represents a node waiting time of an i-th node in an information chain starting at a k-th moment in a service time chain; $\tau_{node\_y,i,m,k}$ represents a node execution time of the i-th node in the information chain starting at the k-th moment in the service time chain; $\tau_{channel\_x,j,m,k}$ represents a message waiting time of a j-th network channel in the information chain starting at the k-th moment in the service time chain; and $\tau_{channel\_y,j,m,k}$ represents a message transmission time of the j-th network channel in the information chain starting at the k-th moment in the service time chain.

(1) Under the first routing work policy, the information chain of the automatic emergency braking system may include: the ADAS domain controller—the central gateway—the vehicle chassis domain. Through analysis, it can be seen that the number of node hop(s) is 1 (i.e. the central gateway), and the number of channel(s) is 2 (i.e. the ADAS domain controller—the central gateway, and the central gateway—the vehicle chassis domain). With the fractional basic period scheduling procedure, ignoring the node waiting time and the message waiting time, the loop delay may be calculated by:

$$\tau_{service1} = \tau_{node\_y1} + \sum_{j=1}^{2}\tau_{channel_{y1},j}$$

where, $\tau_{service1}$ represents the loop delay of the information chain of the automatic emergency braking system under the normal work policy; $\tau_{node\_y1}$ represents the node execution time of 1 hop between the ADAS domain controller and the vehicle chassis domain in the automatic emergency braking system under the normal work policy; $\tau_{channel_{y1}}$ represents the message transmission time of the network channel that is the ADAS domain controller—the central gateway; and $\tau_{channel_{y1},2}$ represents the message transmission time of the network channel that is the central gateway—the vehicle chassis domain.

(2) Under the second routing work policy, the information chain of the automatic emergency braking system may include: the ADAS domain controller—the vehicle audio and video domain controller/energy domain controller—the vehicle chassis domain. Through analysis, it can be seen that the number of node hop(s) is 1 (i.e. the vehicle audio and video domain controller/energy domain controller), and the number of channel(s) is 2 (i.e. the ADAS domain controller—vehicle audio and video domain controller/energy domain controller, and the vehicle audio and video domain controller/energy domain controller—the vehicle chassis domain). With the fractional basic period scheduling procedure, ignoring the node waiting time and the message waiting time, the loop delay may be calculated by:

$$\tau_{service2} = \tau_{node\_y2} + \sum_{j=1}^{2}\tau_{channel_{y2},j}$$

where, $\tau_{service2}$ represents the loop delay of the information chain of the automatic emergency braking system under the policy for fault condition 1; $\tau_{node\_y2}$ represents the node execution time of 1 hop between the ADAS domain controller and the vehicle chassis domain in the automatic emergency braking system under the policy for fault condition 1; $\tau_{channel_{y2},1}$ represents the message transmission time of the network channel that is the ADAS domain controller—the vehicle audio and video domain controller/energy domain controller; and $\tau_{channel_{y2},2}$ represents the message transmission time of the network channel that is the vehicle audio and video domain controller/energy domain controller—the vehicle chassis domain.

(3) Under the third routing work policy, the information chain of the automatic emergency braking system may include: the ADAS domain controller—the energy domain controller—the vehicle chassis domain. Through analysis, it can be seen that the number of node hop(s) is 1 (i.e. the energy domain controller), and the number of channel(s) is 2 (i.e. the ADAS domain controller—the energy domain controller, and the energy domain controller—the vehicle chassis domain). With the fractional basic period scheduling procedure, ignoring the node waiting time and the message waiting time, the loop delay may be calculated by:

$$\tau_{service3} = \tau_{node\_y3} + \sum_{j=1}^{2}\tau_{channel_{y3},j}$$

where, $\tau_{service3}$ represents the loop delay of the information chain of the automatic emergency braking system under the policy for fault condition 2; $\tau_{node\_y3}$ represents the node execution time of 1 hop between the ADAS domain controller and the vehicle chassis domain in the automatic emergency braking system under the policy for fault condition 2; $\tau_{channel_{y3},1}$ represent the message transmission time of the network channel that is the ADAS domain controller—the energy domain controller; and $\tau_{channel_{y3},2}$ represents the message transmission time of the network channel that is the energy domain controller—the vehicle chassis domain.

(4) Under the fourth routing work policy, the information chain of the automatic emergency braking system may be: the ADAS domain controller—the vehicle audio and video domain controller—the vehicle chassis domain. Through analysis, it can be seen that the number of node hop(s) is 1 (i.e. the vehicle audio and video domain controller), and the number of channel(s) is 2 (i.e. the ADAS domain controller—the vehicle audio and video domain controller, and the vehicle audio and video domain controller—the vehicle chassis domain). With the fractional basic period scheduling procedure, ignoring the node waiting time and the message waiting time, the loop delay may be calculated by:

$$\tau_{service4} = \tau_{node\_y4} + \sum_{j=1}^{2}\tau_{channel_{y4},j}$$

where, $\tau_{service4}$ represents the loop delay of the information chain of the automatic emergency braking system under the policy for fault condition 3; $\tau_{node\_y4}$ represents the node execution time of 1 hop between the ADAS domain controller and the vehicle chassis domain in the automatic emergency braking system under the policy for fault condition 3; $\tau_{channel_{y4},1}$ represents the message transmission time of the network channel that is the ADAS domain controller—the vehicle audio and video domain controller; and $\tau_{channel_{y4},2}$ represents the message transmission time of the network channel that is the vehicle audio and video domain controller—the vehicle chassis domain.

Based on the calculation and analysis of the loop delay of the four routing policies, it can be seen that: under the four routing policies, the number of node hop(s) between the ADAS domain controller and the vehicle chassis domain controller in the automatic emergency braking system is identically equal 1, the number of network channel(s) is identically equal 2, and the messages in a system scheduling table under the four routing policies are identical. Therefore, it can be seen that:

$$\tau_{service1}=\tau_{service2}=\tau_{service3}=\tau_{service4}$$

That is, in an embodiment of the automatic emergency braking network control system of the diagonal equal-hop heterogeneous composite redundancy domain architecture, the change in system structure caused by local system fault(s) will not affect the network control performance of the system.

Figure 3:
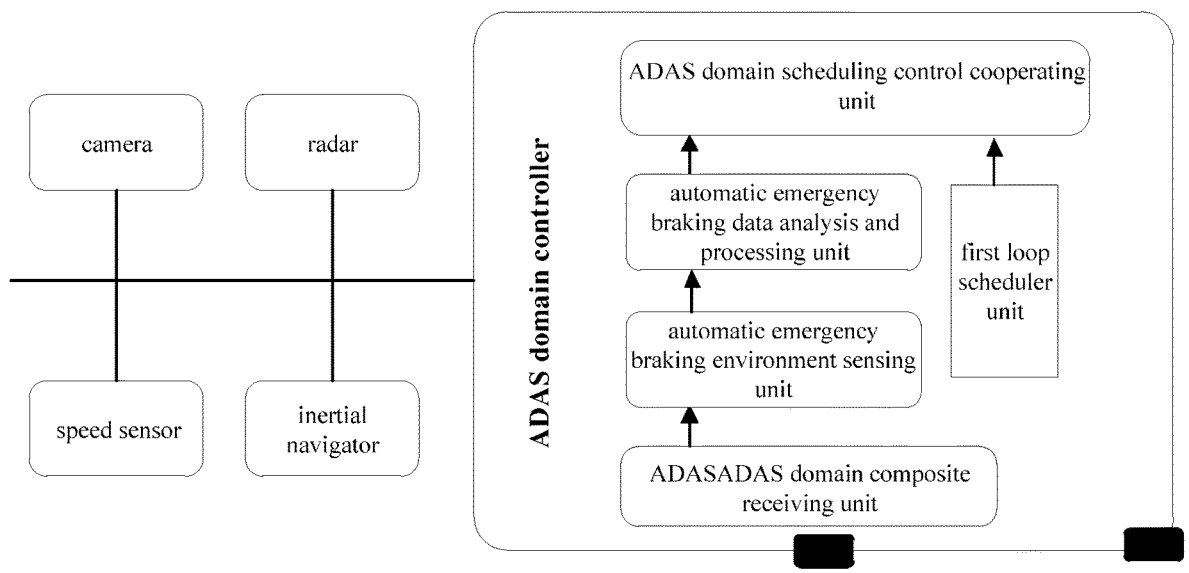
FIG. 3 is a schematic diagram of the structure of an ADAS domain controller according to an embodiment of the present disclosure.

As shown in FIG. 3, the ADAS domain controller in the embodiment may include: an ADAS domain composite receiving unit, an automatic emergency braking environment sensing unit, an automatic emergency braking data analysis and processing unit, an ADAS domain scheduling control cooperating unit, and a first loop scheduler unit. The ADAS domain composite receiving unit may be configured to receive signals from a camera, a radar, a speed sensor and an inertial navigator that are transmitted to the ADAS domain controller; the automatic emergency braking environment sensing unit may be configured to perform multi-sensor signals fusion on the received signals from the camera and the radar; the automatic emergency braking data analysis and processing unit may be configured to determine an execution moment of automatic emergency braking and send a braking acceleration signal; the first loop scheduler unit may be configured to transmit scheduling signal(s) of the ADAS domain controller; and the ADAS domain scheduling control cooperating unit may be configured to cooperate the braking acceleration signal with the scheduling signal(s) of the first loop scheduler unit.

Meanwhile, the ADAS domain controller in the embodiment may also be connected to the camera, the radar, the speed sensor and the inertial navigator. The camera may be configured to receive an image signal of an obstruction ahead; the radar may be configured to measure the distance from the obstruction ahead; the speed sensor may be configured to determine the speed of the vehicle; and the inertial navigator may be configured to determine the acceleration of the vehicle.

Figure 4:
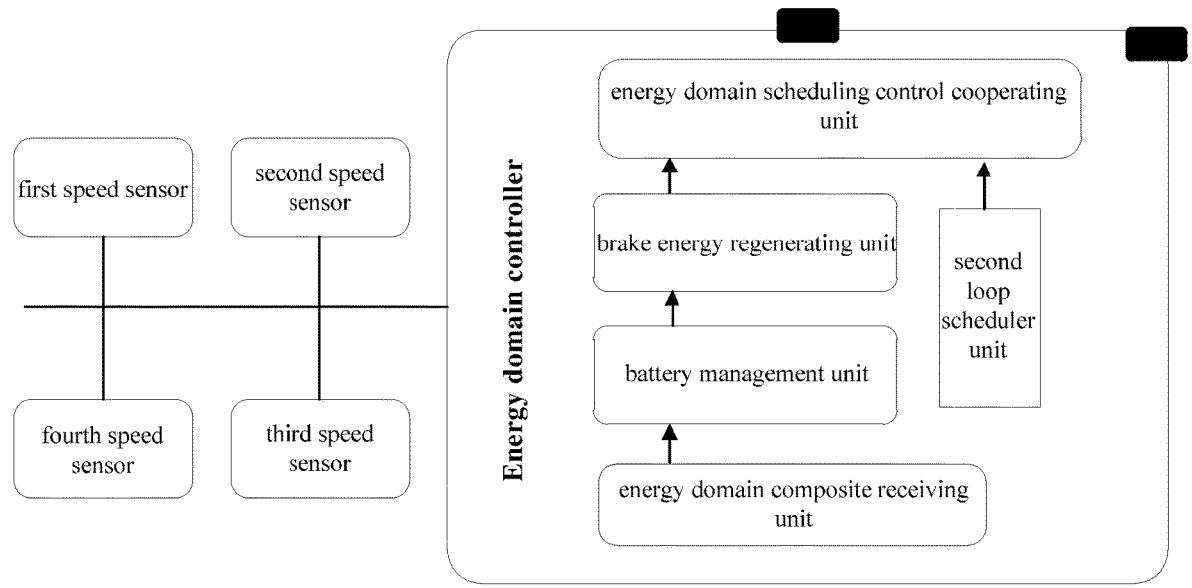
FIG. 4 is a schematic diagram of the structure of an energy domain controller according to an embodiment of the present disclosure.

As shown in FIG. 4, the energy domain controller in the embodiment may include: an energy domain composite receiving unit, a battery management unit, a brake energy regenerating unit, an energy domain scheduling control cooperating unit, and a second loop scheduler unit. The energy domain composite receiving unit may be configured to receive a control signal and a sensor signal that are sent to the energy domain controller; the battery management unit may be configured to determine and calculate a current battery level; the brake energy regenerating unit may be configured to determine a brake energy regenerating policy; the second loop scheduler unit may be configured to transmit scheduling signal(s) of the energy domain controller; and the energy domain scheduling control cooperating unit may be configured to cooperate a brake energy regenerating control signal with a scheduling signal of the second loop scheduler unit.

Meanwhile, the energy domain controller in the embodiment may also be connected to a first speed sensor, a second speed sensor, a third speed sensor and a fourth speed sensor. The four speed sensors may be configured to collect vehicle speed for determining whether to enable braking energy regenerating.

Figure 5:
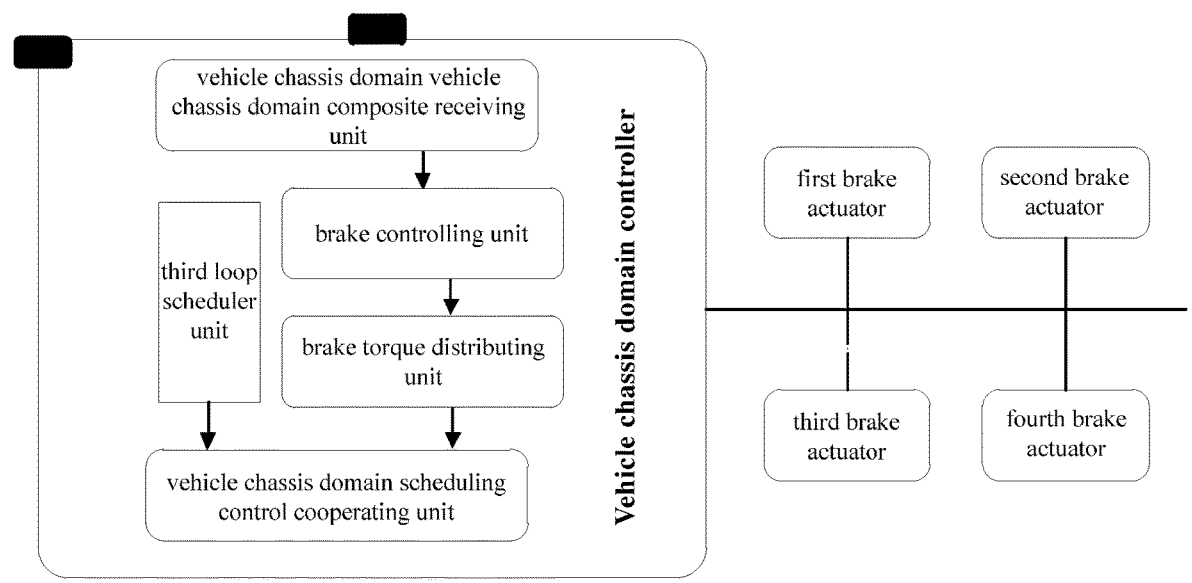
FIG. 5 is a schematic diagram of the structure of a vehicle chassis domain controller according to an embodiment of the present disclosure.

As shown in FIG. 5, the vehicle chassis domain controller in the embodiment may include: a vehicle chassis domain vehicle chassis domain composite receiving unit, a brake controlling unit, a brake torque distributing unit, a vehicle chassis domain scheduling control cooperating unit, and a third loop scheduler unit. The vehicle chassis domain composite receiving unit may be configured to receive an acceleration control signal sent to the vehicle chassis domain controller; the brake controlling unit may be configured to convert the received acceleration control signal into a brake torque control signal; the brake torque distributing unit may be configured to proportionally adjust the size of the brake torque control signal of each wheel; the third loop scheduler unit may be configured to transmit scheduling signal(s) of the vehicle chassis domain controller; and the vehicle chassis domain scheduling control cooperating unit may be configured to cooperate the brake torque control signal with the scheduling signal(s) of the third loop scheduler unit.

Meanwhile, the vehicle chassis domain controller in the embodiment may also be connected to a first brake actuator, a second brake actuator, a third brake actuator, and a fourth brake actuator. The four brake actuators may be used to execute the brake torque control signal of the vehicle chassis domain controller, the brake torque control signal acts on the four wheels.

Figure 6:
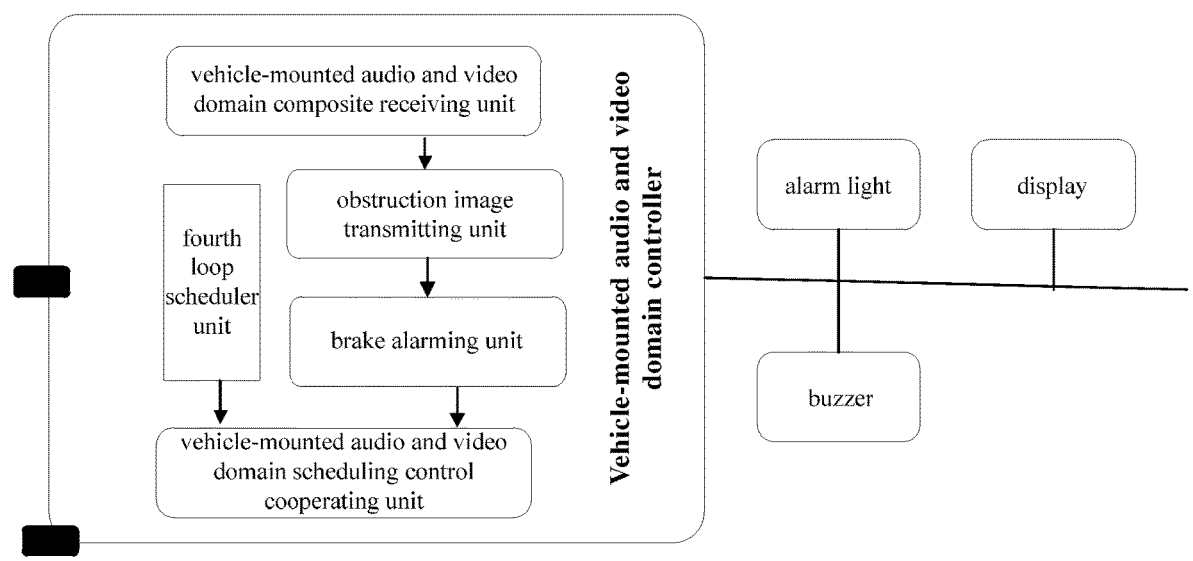
FIG. 6 is a schematic diagram of the structure of a vehicle-mounted audio and video domain controller according to an embodiment of the present disclosure.

As shown in FIG. 6, the vehicle-mounted audio and video domain controller in the embodiment may include: a vehicle-mounted audio and video domain composite receiving unit, an obstruction image transmitting unit, a brake alarming unit, a vehicle-mounted audio and video domain scheduling control cooperating unit, and a fourth loop scheduler unit. The vehicle-mounted audio and video domain composite receiving unit may be configured to receive signals of the camera and the radar sent to the vehicle audio and video domain controller; the obstruction image transmitting unit may be configured to transmit an image signal of an obstruction; the brake alarming unit may be configured to transmit a brake alarming control signal; the fourth loop scheduler unit may be configured to transmit the scheduling signal(s) of the vehicle-mounted audio and video domain controller; and the vehicle-mounted audio and video domain scheduling control cooperating unit may be configured to cooperate video signal(s), the brake alarming control signal, and the scheduling signal(s) of the fourth loop scheduler unit. Meanwhile, the vehicle-mounted audio and video domain controller may also be connected with an alarm for light up an alarm light to alert the driver, a display for displaying an image in front and the distance from the vehicle in front, and a buzzer for sounding an alarm to alert the driver.

In summary, the scheme proposed in this embodiment first provides a design system for a diagonal equal-hop heterogeneous composite redundancy domain architecture with high safety redundancy management. The system integrates the design of star topology and annular topology, providing a safety assurance scheme of multiple transmission redundancy for the design of intelligent electric vehicle system architecture; so that in the event of system component failure, the system node span can remain unchanged, and the system control performance can remain unchanged. In addition, based on the proposed design system for the diagonal equal-hop heterogeneous composite redundancy domain architecture, the proposed scheme also integrates the characteristics of the proposed domain architecture system and the automatic emergency braking system, proposes an automatic emergency braking network control system of the diagonal equal-hop heterogeneous composite redundancy domain architecture, as well as four routing policies for various fault situations. The proposed scheme also incorporates the fractional basic period scheduling procedure, which can effectively suppress network congestion and delay, improve the real-time performance of the automatic emergency braking system, and provide more powerful technical support for the safety of intelligent electric vehicles.

Embodiment 2

An intelligent vehicle provided in this embodiment may include the diagonal equal-hop heterogeneous composite redundancy domain architecture of an intelligent vehicle disclosed in the Embodiment 1.

The present disclosure has been described above with reference to the above specific embodiments, which are merely provided for the purpose of understanding and are not intended to limit the present disclosure. It will be possible for those skilled in the art to make simple deductions, deformations, or substitutions based on the principle of the present disclosure.

The invention claimed is:

1. A diagonal equal-hop heterogeneous composite redundancy domain architecture of an intelligent vehicle, comprising: a central gateway, an ADAS domain controller, a vehicle-mounted audio and video domain controller, a vehicle chassis domain controller and an energy domain controller;

wherein, the central gateway is coupled to the ADAS domain controller, the vehicle-mounted audio and video domain controller, the vehicle chassis domain controller and the energy domain controller in a communicative manner respectively, such that the central gateway, the ADAS domain controller, the vehicle-mounted audio and video domain controller, the vehicle chassis domain controller and the energy domain controller form a star connection topological structure; and the ADAS domain controller is coupled to the vehicle-mounted audio and video domain controller and the energy domain controller respectively in a communicative manner, and the vehicle chassis domain controller is coupled to the vehicle-mounted audio and video domain controller and the energy domain controller respectively in a communicative manner, such that the ADAS domain controller, the vehicle-mounted audio and video domain controller, the vehicle chassis domain controller and the energy domain controller form an annular connection topological structure;

wherein a communication routing status among the central gateway, the ADAS domain controller, the vehicle-mounted audio and video domain controller, the vehicle chassis domain controller and the energy domain controller is detected in real time, and a corresponding routing work policy is selected based on the communication routing status;

wherein the routing work policy comprises:

a first routing work policy, in which the ADAS domain controller, the vehicle-mounted audio and video domain controller, the vehicle chassis domain controller and the energy domain controller transmit data thereamong through the central gateway when the central gateway operates normally;

a second routing work policy, in which the ADAS domain controller, the vehicle-mounted audio and video domain controller, the vehicle chassis domain controller and the energy domain controller transmit data thereamong through the annular connection topological structure when the central gateway fails;

a third routing work policy, in which when the central gateway fails and communication between the vehicle-mounted audio and video domain controller and the vehicle chassis domain controller also fails, a communication routing is: intercommunication between the vehicle-mounted audio and video domain controller and the ADAS domain controller, intercommunication between the ADAS domain controller and the energy domain controller, and communication between the energy domain controller and the vehicle chassis domain controller; and a fourth routing work policy, in which when the central gateway fails and communication between the ADAS domain controller and the energy domain controller also fails, a communication routing is: intercommunication between the ADAS domain controller and the vehicle-mounted audio and video domain controller, intercommunication between the vehicle-mounted audio and video domain controller and the vehicle chassis domain controller, and intercommunication between the vehicle chassis domain controller and the energy domain controller.

2. The diagonal equal-hop heterogeneous composite redundancy domain architecture according to claim 1, wherein a communication node spacing between the ADAS domain controller and the vehicle chassis domain controller is always 1; and a communication node spacing between the vehicle-mounted audio and video domain controller and the energy domain controller is always 1.

3. The diagonal equal-hop heterogeneous composite redundancy domain architecture according to claim 1, wherein the central gateway is coupled to the ADAS domain controller, the vehicle-mounted audio and video domain controller, the vehicle chassis domain controller and the energy domain controller in a communicative manner through dual redundance vehicle-mounted Ethernet or CANFD;

the ADAS domain controller is also coupled to the vehicle-mounted audio and video domain controller and the energy domain controller respectively in a communicative manner through annular inter-domain vehicle-mounted Ethernet or CANFD; and the vehicle chassis domain controller is also coupled to the vehicle-mounted audio and video domain controller and the energy domain controller respectively in a communicative manner through annular inter-domain vehicle-mounted Ethernet or CANFD.

4. The diagonal equal-hop heterogeneous composite redundancy domain architecture according to claim 1, wherein the ADAS domain controller comprises: an ADAS domain composite receiving unit, an automatic emergency braking environment sensing unit, an automatic emergency braking data analysis and processing unit, an ADAS domain scheduling control cooperating unit and a first loop scheduler unit.

5. The diagonal equal-hop heterogeneous composite redundancy domain architecture according to claim 1, wherein the energy domain controller comprises: an energy domain composite receiving unit, a battery management unit, a brake energy regenerating unit and a second loop scheduler unit.

6. The diagonal equal-hop heterogeneous composite redundancy domain architecture according to claim 1, wherein the vehicle chassis domain controller comprises: a vehicle chassis domain composite receiving unit, a brake controlling unit, a brake torque distributing unit, a vehicle chassis domain scheduling control cooperating unit and a third loop scheduler unit.

7. The diagonal equal-hop heterogeneous composite redundancy domain architecture according to claim 1, wherein the vehicle-mounted audio and video domain controller comprises: a vehicle-mounted audio and video domain composite receiving unit, an obstruction image transmitting unit, a brake alarming unit, a vehicle-mounted audio and video domain scheduling control cooperating unit and a fourth loop scheduler unit.

8. An intelligent vehicle, comprising the diagonal equal-hop heterogeneous composite redundancy domain architecture of an intelligent vehicle according to claim 1.

* * * * *